United States Patent Office 3,238,015
Patented Mar. 1, 1966

3,238,015
PROCESS FOR THE PRODUCTION OF POTASSIUM MAGNESIUM FLUORIDE
Zevoulun Pessahovitz, Kibutz Maagan Michael, Simcha Harel, Haifa, and Charles (Haim) Klein, Akko, Israel, assignors to Chemicals & Phosphates Ltd., Ir Ganim, Haifa Bay, Israel, a company of Israel
No Drawing. Filed May 29, 1963, Ser. No. 283,978
5 Claims. (Cl. 23—88)

It is an object of the present invention to provide a novel process for the production of potassium magnesium fluoride. It is a further object of the present invention to provide a novel process for the production of a double salt of potassium fluoride and magnesium fluoride containing these constituents in a 1:1 molar ratio. Other and further objects of the invention will become apparent hereinafter.

The double salt $KFMgF_2$ is known from literature, but it does not seem to be available commercially. It can be prepared by the fusion of magnesium fluoride with potassium fluoride, but no alternative and more convenient method is known hitherto. This double salt is of use in metallurgy, and especially in the metallurgy of magnesium and aluminum.

In copending patent application Serial No. 284,005, executed and filed together with this patent application, there is described a novel process for the production of magnesium fluoride.

We have now found that it is possible to produce potassium magnesium fluoride of high potassium fluoride content by dissolving freshly precipitated thixotropic magnesium fluoride of small crystal size in hot potassium fluoride which is used in an excess of 50 to 100 percent respective the magnesium fluoride. The double fluoride which is thus formed is separated from the reaction mixture, washed and dried. Thixotropic magnesium fluoride is sufficiently soluble in hot potassium fluoride for the desired reaction, although the solubility of magnesium fluoride in water is only about 76 mg./liter. The remaining mother liquor contains substantial quantities of potassium fluoride, and this may be used for the production of magnesium fluoride, or after concentration, in the process according to this invention. The double salt has a solubility of 0.027% at 16° C. and of 0.097% at 100° C.

A fuller understanding may be had by referring to the following examples, which are to be construed in a non-limitative manner.

Example 1

Small particle size thixotropic magnesium fluoride produced by a process as described in copending patent application Serial No. 284,005, by adding simultaneously with stirring an aqueous solution of a water-soluble magnesium salt and an aqueous solution of a water-soluble fluoride, at a temperature of from between 60° C. and the boiling temperature of the reaction mixture, the addition being effected during about 30 to 50 minutes, was filtered, washed with water and reslurried with an equal quantity of water and added gradually to a hot solution of potassium fluoride. A quantity of 65 g. magnesium fluoride was added during 30 minutes to 420 ml. of 300 g./liter potassium fluoride at 100° C. The product was filtered off, washed with water and dried. A crop of 125.6 g. potassium magnesium fluoride was obtained, containing 48% by weight potassium fluoride.

Example 2

An experiment was carried out as in Example 1, but with 210 ml. of 300 g./liter potassium fluoride. The precipitate contained 37.8% by weight of potassium fluoride.

When an excess of about 50–100 percent potassium fluoride is used, more potassium fluoride is introduced into the product than when stoichiometric quantities are used. Thus there may be prepared potassium fluoride/magnesium fluoride compositions containing different quantities of potassium fluoride, up to a maximum of a 1:1 molar ratio. The potassium fluoride solution can contain from 200 to 600 grams potassium fluoride per liter.

What we claim is:
1. A process for the production of potassium magnesium fluoride ($KF \cdot MgF_2$), which comprises dissolving thixotropic magnesium fluoride in a hot solution of potassium fluoride and separating the solid product.
2. A process as claimed in claim 1, characterized in that a slurry of magnesium fluoride is gradually added to a hot solution of potassium fluoride.
3. A process as claimed in claim 1, characterized in than an excess of from 50 to 100 percent potassium fluoride is used respective the magnesium fluoride.
4. A process as claimed in claim 1, characterized in that the potassium fluoride solution contains from 200 to 600 g. potassium fluoride per liter.
5. A process for the production of a magnesium fluoride-potassium fluoride composition containing a predetermined ratio of potassium fluoride, up to a molar ratio of 1:1, which comprises dissolving small particle size thixotropic magnesium fluoride at an elevated temperature in a predetermined quantity of a hot solution of potassium fluoride, and separating the resulting precipitate.

References Cited by the Examiner
UNITED STATES PATENTS
2,816,816  12/1957  Jackson et al. _____ 23—88
2,877,095   3/1959  Anderson _____ 23—88

OTHER REFERENCES
Pascal's "Nouveau Traite de Chimie Minerale," Tome 4, 1958 Edition, page 268, Masson et Cie, Editeurs, Paris.

MAURICE A. BRINDISI, Primary Examiner.